(12) United States Patent
Sun et al.

(10) Patent No.: US 7,502,521 B2
(45) Date of Patent: Mar. 10, 2009

(54) IMAGE COMPLETION WITH STRUCTURE PROPAGATION

(75) Inventors: Jian Sun, Haidian District (CN); Heung-Yeung Shum, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 561 days.

(21) Appl. No.: 11/158,113

(22) Filed: Jun. 21, 2005

(65) Prior Publication Data

US 2006/0285762 A1      Dec. 21, 2006

(51) Int. Cl.
*G06T 3/00* (2006.01)

(52) U.S. Cl. .................... 382/254; 345/582

(58) Field of Classification Search ........... 345/629, 345/582, 634, 637, 639; 348/590, 598; 382/284, 382/254, 275
See application file for complete search history.

(56) References Cited

U.S. PATENT DOCUMENTS

| | | | |
|---|---|---|---|
| 2003/0099406 A1* | 5/2003 | Georgiev et al. | 382/268 |
| 2003/0210828 A1* | 11/2003 | Georgiev et al. | 382/254 |
| 2004/0164996 A1* | 8/2004 | Criminisi et al. | 345/619 |
| 2006/0284880 A1* | 12/2006 | Zhou et al. | 345/582 |

OTHER PUBLICATIONS

Criminisi et. al., "Object removal by exemplar-based inpainting", 2003 IEEE Computer Society Conference on Computer Vision and Pattern Recognition Proceedings, vol. 2, Jun. 18, 2003, pp. 1-8.*
Jia et. al., "Image Repairing—Robust Image Synthesis by Adaptive ND Tensor Voting", 2003 IEEE Computer Society Conference on Computer Vision and Pattern Recognition Proceedings, vol. 1, Jun. 18, 2003, pp. 1-8.*
Drori et. al., "Fragment-Based Image Completion", ACM Transactions on Graphics (TOG), Proceeding of ACM SIGGRAPH 2003, vol. 22, Issue 3, Jul. 2003, pp. 303-312.*
Sun et. al., "Image completion with structure propagation", ACM Transactions on Graphics (TOG), vol. 24 Issue 3, Jul. 2005, pp. 861-868.*
Gu et al. "Digital image inpainting using the Monte Carlo method", 2004 International Conference on Image Processing, vol. 2, Oct. 24, 2004, pp. 961-964.*

* cited by examiner

*Primary Examiner*—Andrew W Johns
(74) *Attorney, Agent, or Firm*—Lee & Hayes, PLLC

(57) ABSTRACT

Image completion with structure propagation is described. In one aspect, synthesized patches for an unknown region in an input image are automatically generated. The synthesized patches are generated from a known region in the input image based on information from one or more curves. The one or more curves were generated to provide missing structure to the unknown region. Structure is propagated to the unknown region with the synthesized patches.

20 Claims, 11 Drawing Sheets
(8 of 11 Drawing Sheet(s) Filed in Color)

IMAGE COMPLETION WITH STRUCTURE PROPAGATION

BACKGROUND

Image completion, also known as image inpainting, is a challenging problem in computer graphics and computer vision. Image completion aims at filling in missing pixels in a large unknown region of an image in a visually plausible way. Given an input image with an unknown or missing region, the goal of image completion is to propagate structure and texture information from the known or existing regions I-Ω to Ω, where I is the image region of I. Image completion is inherently an under-constrained problem.

Conventional image inpainting techniques typically work at the pixel level, and have worked well for small gaps, thin structures, and text overlays. However, for larger missing regions or textured regions, these existing systems may generate blurring artifacts. Additionally, conventional image completion systems and techniques typically have difficulty completing images where complex salient structures exist in the missing regions, often resulting in discontinuities in salient structure. Such salient structures include, for example, curves, T-junctions, and X-junctions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In view of this, image completion with structure propagation is described. In one aspect, synthesized patches for an unknown region in an input image are automatically generated. The synthesized patches are generated from a known region in the input image based on information from one or more curves. The one or more curves were generated to provide missing structure to the unknown region. Structure is propagated to the unknown region with the synthesized patches

BRIEF DESCRIPTION OF THE DRAWINGS

In the Figures, the left-most digit of a component reference number identifies the particular Figure in which the component first appears. The file of this patent includes at least one drawing executed in color. Copies of this patent with color drawing(s) will be provided by the Patent and Trademark Office upon request and payment of the necessary fee.

DETAILED DESCRIPTION

Overview

This detailed description presents a novel approach to image completion, image completion with structure propagation. Systems and methods for image completion with structure propagation allow a user to specify missing structure information by extending a few curves or line segments from known to unknown regions. This approach synthesizes image patches along these user-specified curves in the unknown region using patches selected around the curves in the known region. The systems and methods formulate structure propagation as a global optimization problem by enforcing structure and consistency constraints. If a user specifies only a single curve, the systems and methods solve structure propagation using dynamic programming. When a user specifies multiple intersecting curves, the systems and methods implement a believe propagation algorithm to find the substantially optimal patches. After completing structure propagation, the systems and methods fill in any remaining unknown regions using patch-based texture synthesis. These and other aspects of image completion with structure propagation are now described in greater-detail below with respect to FIGS. 1 through 11.

An Exemplary System

Although not required, the systems and methods for image completion with structure propagation are described in the general context of computer-executable instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
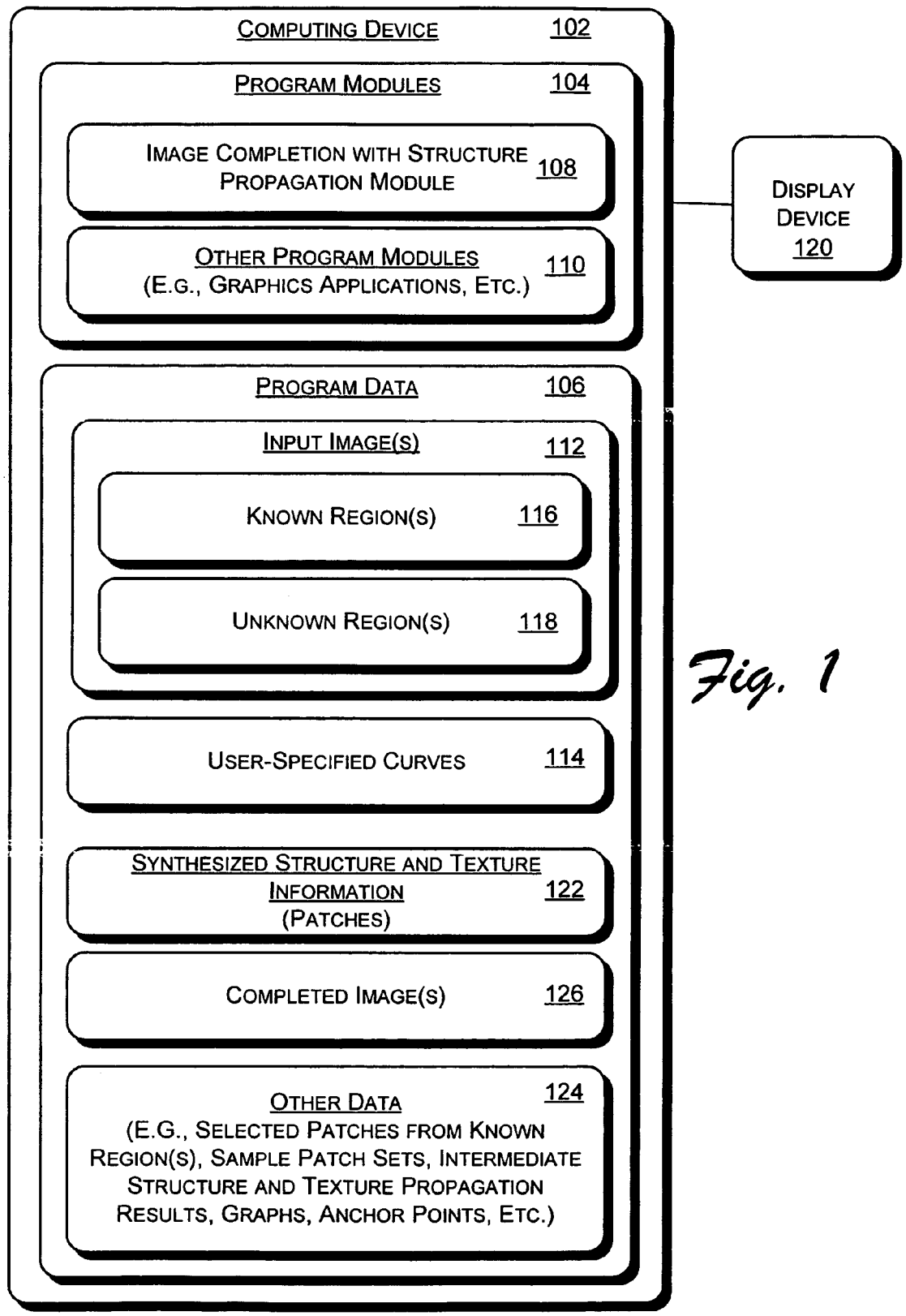
FIG. 1 shows an exemplary system for creating and using image completion with structure propagation.

FIG. 1 shows an exemplary system 100 for creating and using image completion with structure propagation. System 100 includes a general purpose computing device 102. Computing device 102 represents any type of computing device such as a personal computer, a laptop, a server, handheld or mobile computing device (e.g., a cellular phone, personal digital assistant), and/or so on. Computing device 102 includes program modules 104 and program data 106. Program modules 104 include, for example, image completion with structure propagation module 108 (hereinafter often referred to as "structure propagation module 108"), and other program modules 110 such as a graphics application that leverages the image completion capabilities of structure propagation module 108.

Structure propagation module 108 allows a user to specify missing structure information in an input image 112, by creating and extending one or more user-specified curves 114 from known regions 116 to unknown regions 118. Curves 114 may include one or more curves and/or line segments. In one implementation, the input image 112 is displayed on a display device 120, and the user creates curves 114 by drawing line segments on the input image 112 with a pointing device such as a mouse, graphics pen and pad, and/or the like. Structure propagation module 108 synthesizes the missing structure and texture information along these user-specified curves 114 in the unknown region 118 using patches selected around the curves 114 in the known region 116. The synthesized image patches are shown as synthesized structure and texture information 122. The patches selected from known region(s) 116, are shown as respective portions of "other data" 124.

Structure propagation module 108 enforces structure and consistency constraints to formulate structure propagation as a global optimization problem. For all synthesized image patches, structure propagation model 108 globally minimizes any color difference in overlapping area(s) between neighboring patches 122. If a user specifies only a single curve 114, structure propagation module 108 connects the synthesized patches as a chain, and effectively solves the optimization problem using dynamic programming. If the user specifies multiple intersecting curves 114, structure propagation module 108 connects the synthesized patches as a graph, implementing a belief propagation algorithm to find the substantially optimal patches in the known region 116. (Exemplary dynamic programming and an exemplary belief propagation algorithm are described in greater detail below). After completing structure propagation, and since user-specified curves 114 partition input image 112 into several regions, structure propagation module 108 fills in any remaining unknown regions 118 (regions not yet filled in with synthesized structure and texture) using patch-based texture synthesis operations, which utilize samples from respective segmented regions.

In one implementation, structure propagation module 108 utilizes photometric correction operations in the gradient domain to proved improved synthesis results.

Figure 2:
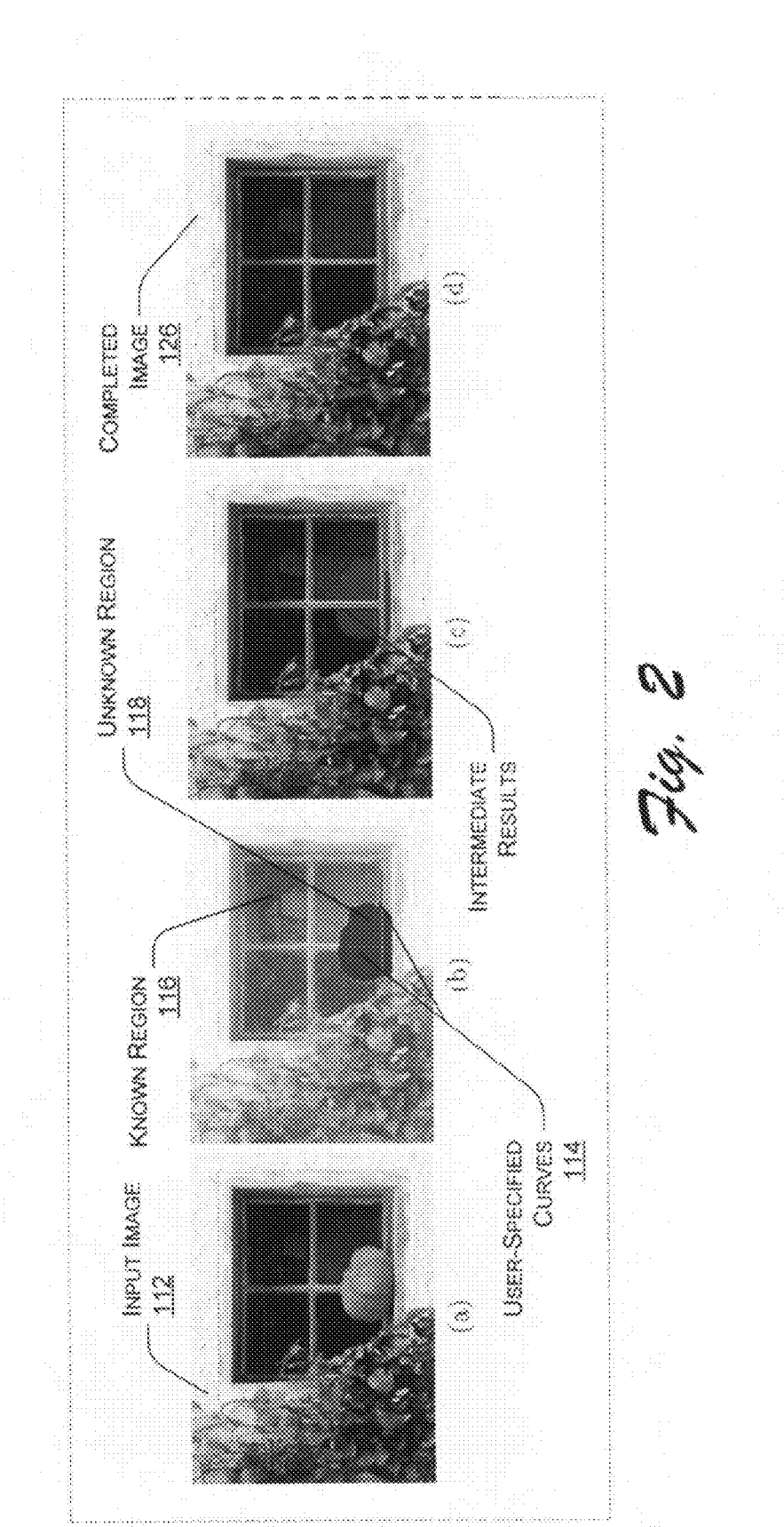
FIG. 2 shows an exemplary set of images associated with image completion with structure propagation.

FIG. 2 shows an exemplary set of images associated with image completion with structure propagation. For purposes of exemplary illustration, the operations of the procedure are described in reference to the components of FIG. 1. In the figures, the left-most digit of a component reference number identifies the particular figure in which the component first appears. More particularly, image (a) is an original input image 112. Image (b) shows an exemplary unknown region 118 associated with the input image 112. In this example, the pumpkin in image (a) has been removed, creating the unknown region 118, which has no color, salient structure, or texture associated with it. Image (b) also shows exemplary user-specified curves 114, or line segments extending from a known region 116 across the unknown reach in 118. In the examples of FIG. 2, the user-specified curves 114 include two substantially perpendicular lines completing the window frames. These two lines significantly reduce inherent ambiguity in the unknown region 118 because they provide information on what structure should be propagated and where texture can be obtained. By drawing a few curves or lines, the user directs structure propagation model 108 to propagate salient structure and generate desired completed images 126. In this example, known region 116 includes color, salient structure, and texture information.

Image (c) of FIG. 2, shows exemplary intermediate results after structure propagation module 108 has propagated structure and texture information (patches) 122 along the user-specified curves 114 as a function of a belief propagation algorithm (described below). For purposes of exemplary illustration, such intermediate results are shown as a respective portion of "other data" 124. Image (d) shows exemplary results (i.e., a completed image 126) after structure propagation module 108 has filled-in unknown regions 118 by texture propagation.

Exemplary Structure Propagation

This section describes structure propagation implemented by structure propagation model 108 in view of a single curve C specified by the user (i.e., user-specified curve 114). More particularly, the addressed problem is how to synthesize missing structure and texture along the curve C in the unknown region 118 by using samples around the curve 114 in the known region 116. (Applying structure propagation for multiple intersecting curves is discussed below in the section titled "Exemplary Graph Structure Propagation").

Figure 3:
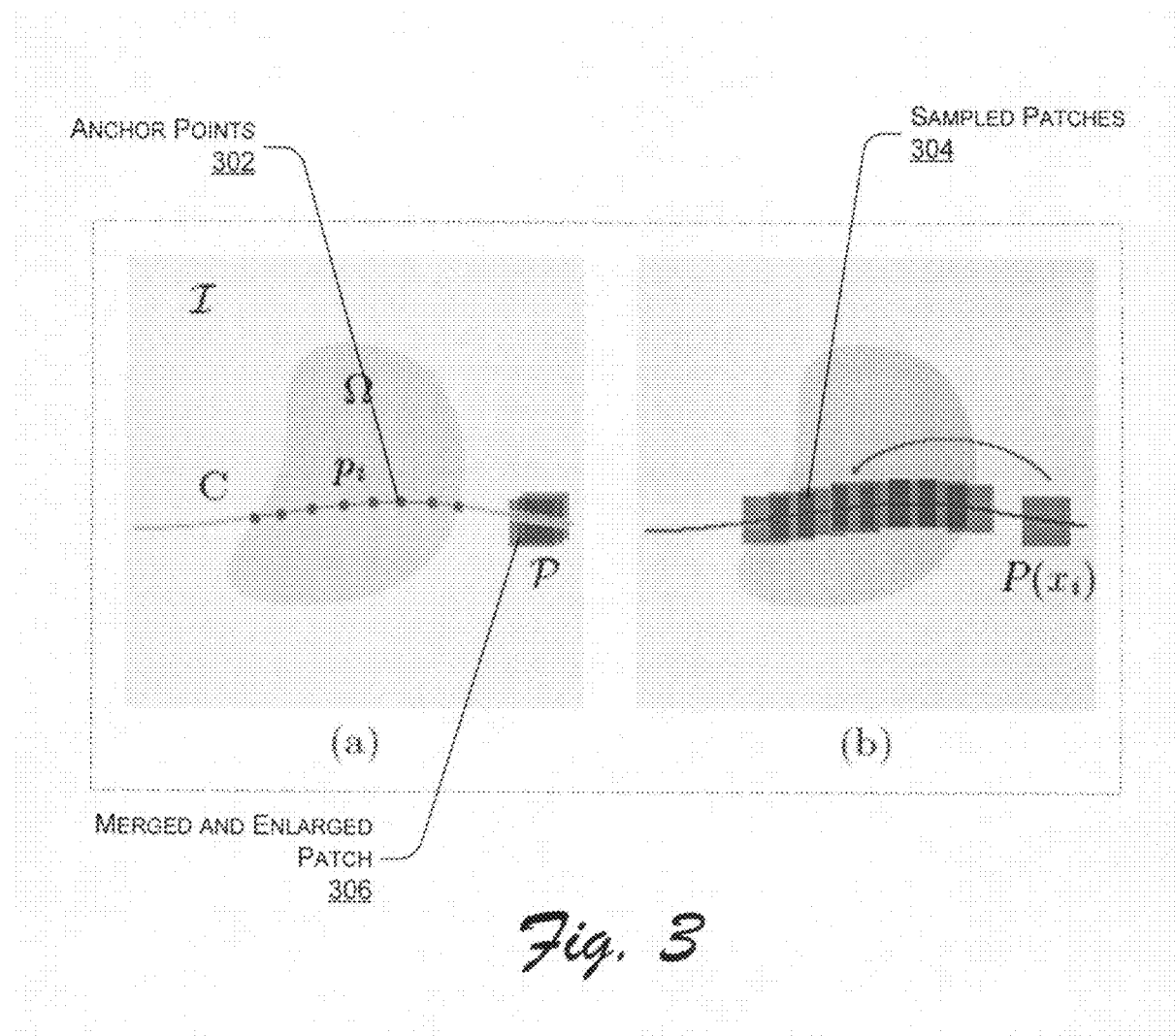
FIG. 3 shows the exemplary structure propagation along a one-dimensional chain of patches.

FIG. 3 shows the exemplary structure propagation along a one-dimensional chain of patches. For purposes of exemplary illustration, the operations of the procedure are described in reference to the components of FIG. 1. In the figures, the left-most digit of a component reference number identifies the particular figure in which the component first appears. More particularly, in FIG. 3, image (a), I is the input image region (input image 112), $\Omega$ is the unknown region (unknown region 118) and C is a user-specified curve 114. Structure propagation module 108 synthesizes missing image patches on a set of anchor points $\{p_i\}_{i=1}^{L}$ using the sample set P. Such synthesized patches are shown as patches 304 in FIG. 3, and patches 122 in FIG. 1. In FIG. 3, image (b), $P(x_i)$ is a candidate patch in P which is chosen for the anchor point $p_i$.

Structure propagation module 108 sparsely samples curve C in the unknown region $\Omega$ to generate a set of L anchor points $\{p_i\}_{i=1}^{L}$. As illustrated in FIG. 3, image (a), centers of synthesized patches 122 are located at these anchor points, which form a single chain, or a one-dimensional graph G={V,E}. V is the set of L nodes corresponding to the anchor points, and E is the set of all edges connecting adjacent nodes on C. In one implementation, structure propagation module 108 utilizes a sampling interval that is typically half of the patch size to guarantee sufficient synthesized patch overlaps. In one implementation, patch size is user configurable. For example, in one implementation patch size is set to be greater than the largest structure in the input image 112. Outside $\Omega$, the sample set P={P(1),P(2), . . . , P(N)} contains all patches whose centers are within a narrow band (typically 1-5 pixels wide) along curve C, as shown in FIG. 3(a). In one implementation, the sample size N is in an order of hundreds or thousands.

In one implementation, structure propagation module 108 addresses structure propagation as a graph-labeling problem. For each anchor position $p_i$, there is a label $X_i \in \{1,2, \ldots, N\}$ corresponding to one of the sample patches. Structure propagation module 108 selects the sample patch $P(x_i)$ from P, and pastes it at point $p_i$ as shown for example, in image (b) of FIG. 3.

Exemplary Energy Minimization

Figure 4:
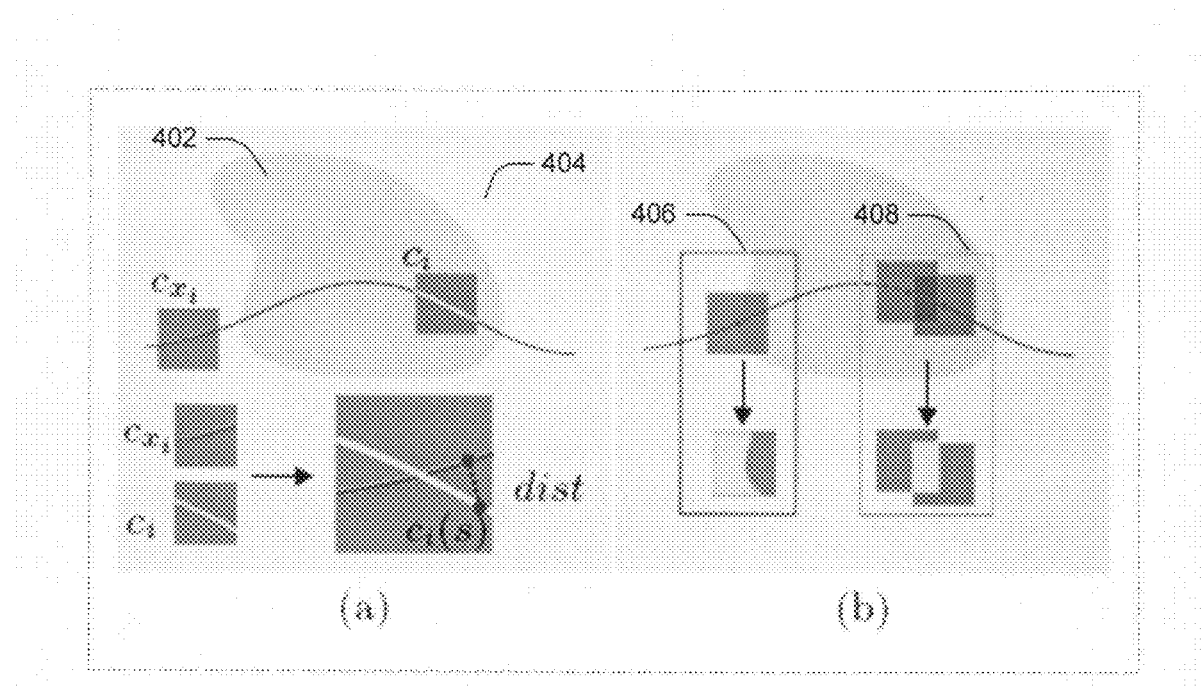
FIG. 4 shows exemplary energy terms for patch synthesis operations of image completion with structure propagation.

FIG. 4 shows exemplary energy terms for patch synthesis operations of image completion with structure propagation. For purposes of exemplary illustration, the operations of the procedure are described in reference to the components of FIG. 1. In the figures, the left-most digit of a component reference number identifies the particular figure in which the component first appears. More particularly, image (a) shows curve segments $c_{x_i}$ in a source patch (i.e., a patch from a known region 116), and curve segments $c_i$ in the target rectangle (i.e., a patch in an unknown region 118). $E_S(x_i)$ measures the structure similarity between $c_{x_i}$ and $C_i$. The term dist is the shortest distance (black dotted line) from point $c_i(s)$ on segment $c_i$ to segment $c_{x_i}$. Referring to FIG. 4, image (b), box

406 shows an exemplary cost $E_1(x_i)$ on the boundary of the unknown region 118. Box 408 shows an exemplary cost $E_2(x_i,x_j)$ for neighboring patches (i.e., synthesized patches 122).

The following energy is defined on G, wherein G represents a graph for all anchor points in the unknown region:

$$E(X) = \sum_{i \in V} E_1(x_i) + \sum_{(i,j) \in E} E_2(x_i, x_j), \quad (1)$$

wherein $$E_1(x_i) = k_s \cdot E_S(x_i) + k_i \cdot E_I(x_i). \quad (2)$$

$E_S(x_i)$, $E_1(x_i)$ and $E_2(x_i,x_j)$ are energy terms for structure, completion, and coherence constraints, respectively. Terms $k_s$ and $k_i$ represent relative weights. In one implementation, $k_s$ and $k_i$ are respectively 50 and 2. Optimal sample labels corresponding to sample patches $X=\{x_i\}_{i=1}^L$ (each label is associated with the respective anchor point) are obtained by minimizing the energy $E(X)$. $E_S(x_i)$ encodes structure similarity between the source patch and the structure indicated by the user at each node i.

Referring to FIG. 4, suppose that source patch $P(x_i)$ and a target rectangle with the same size centered at anchor point $p_i$ contain two curve segments $c_{x_i}$ and $c_i$ (the user-specified and anchor point curves in FIG. 4, image (a)), respectively. In structure propagation, a source patch $P(x_i)$ whose $c_{x_i}$ is similar to $c_i$ is utilized to generate the structure desired by the user. Therefore, the following symmetric energy term based on curves $c_i$ and $c_{x_i}$ is introduced:

$$E_S(x_i) = d(c_i, c_{x_i}) + d(c_{x_i}, c_i), \quad (3)$$

where $$d(c_i, c_{x_i}) = \sum_s \|dist(c_i(s), c_{x_i})\|^2$$

is the sum of the shortest distance between all points in segment $c_i$ and $c_{x_i}$. Note that s is the index of the point in segment $c_i$, and $dist(c_i(s),c_{x_i})$ is the shortest distance from point $c_i(s)$ on segment $c_i$ to segment $c_{x_i}$, as shown in the merged and enlarged patch 306 in FIG. 4, image (a). Structure propagation module 108 further normalizes $E_S(x_i)$ by dividing the total number of points in $c_i$.

$E_1(x_i)$ constrains synthesized patches 122 on the boundary of unknown region $\Omega$ to match well with the known pixels in I-$\Omega$, as shown in box 406 of FIG. 4. $E_1(x_i)$ is the sum of the normalized squared differences (SSD) calculated in box 408 on boundary patches. Structure propagation model 108 sets $E_1(x_i)$ to zero for all other patches inside $\Omega$.

$E_2(x_i,x_j)$ encodes the coherence constraint between two adjacent synthesized patches $P(x_i)$ and $P(x_j)$, where $x_i$ and $x_j$ are labels for adjacent nodes. This energy term is defined as the normalized SSD between their overlapped regions, which are shown in box 408 of FIG. 4.

Exemplary Dynamic Programming (DP)

Since G is a single chain, minimizing the energy $E(X)$ for structure propagation can be regarded as searching for a minimal cost path with dynamic programming. To find the minimal cost path from node 1 to L, $M_i(x_i)$ is defined as the cumulative minimal cost from node 1 to node i for all possible $x_i$. Structure propagation module 108 utilizes dynamic programming to traverse the nodes from 2 to L and compute $M_i(x_i)$ for all the paths recursively as follows:

$$M_i(x_i) = E_1(x_i) + \min_{x_{i-1}}\{E_2(x_{i-1}, x_i) + M_{i-1}(x_{i-1})\}, \quad (4)$$

wherein $M_1(x_1)=E_1(x_1)$. Structure propagation model 108 obtains the optimal label of node L by: $x_L^*=\mathrm{argmin}_{x_L}M_L(x_L)$. The minimal cost path is back-traced by maintaining a table during the computation of $M_i(x_i)$. (Such a table is represented with a respective portion of "other data" 124). This yields the optimal labels for all nodes (nodes correspond to anchor points).

Exemplary Graph Structure Propagation

Figure 5:
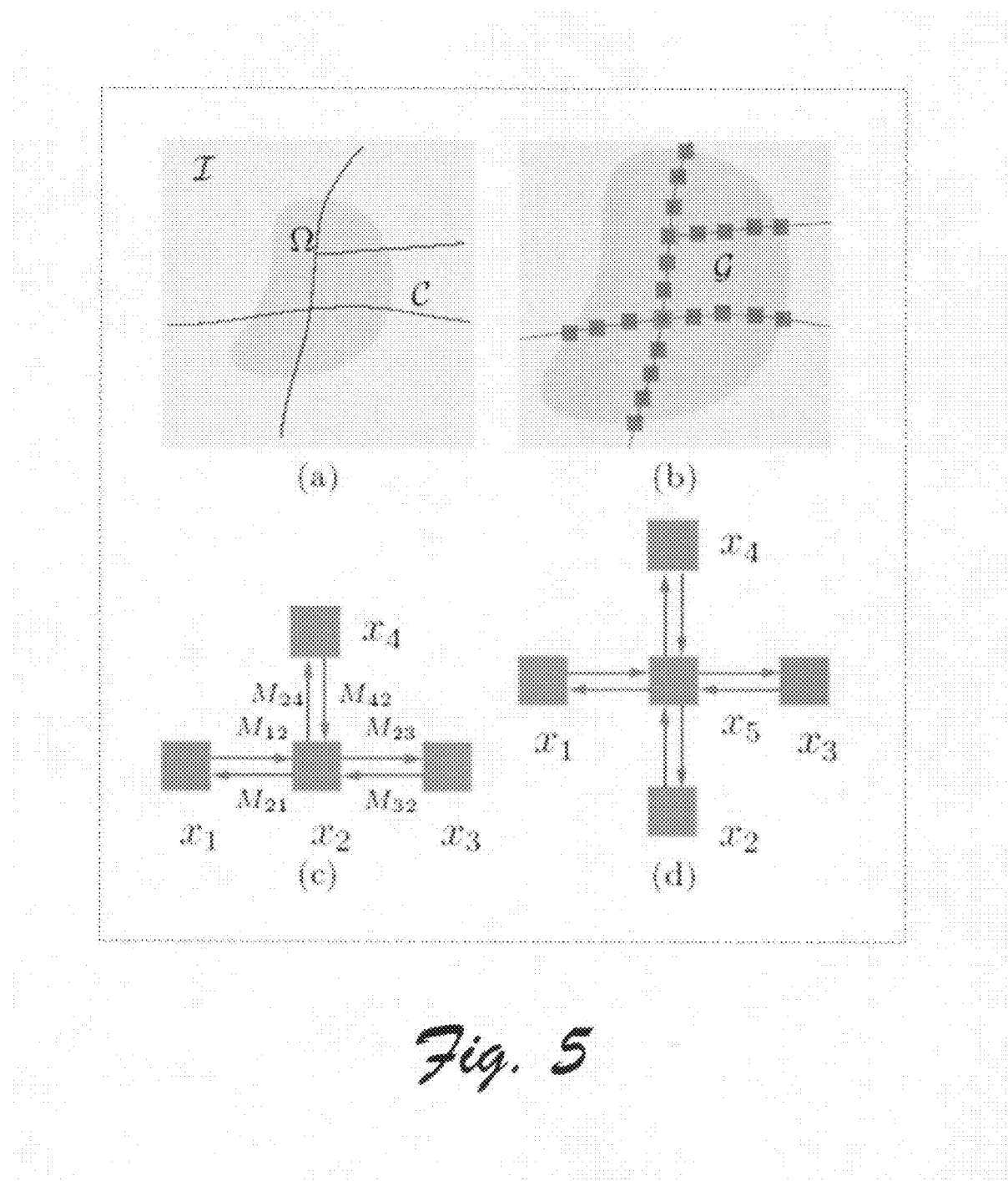
FIG. 5 shows and exemplary two-dimensional graph for structure propagation operations handling multiple-intersecting user-specified curves/line segments.

FIG. 5 shows and exemplary two-dimensional graph for structure propagation operations handling multiple-intersecting user-specified curves/line segments. For purposes of exemplary illustration, the operations of the procedure are described in reference to the components of FIG. 1. In the figures, the left-most digit of a component reference number identifies the particular figure in which the component first appears. More particularly, image (a) shows an exemplary curve set C (i.e., user-specified curves 114). Image (b) shows an exemplary corresponding 2D graph G for structure propagation along the user-specified curves 114. Image (c), in this example, shows a basic T-junction structure in the two-dimensional graph. Image (d), in this example, shows a basic X-junction structure in the two-dimensional graph.

For a complex scene, a single chain of synthesized patches 122 may not sufficiently represent missing salient structures in an unknown region 118. For instance, FIG. 5, image (a) shows a more complex situation where three curves with two intersections are specified by the user. To construct a graph G from these three curves, both intersections are first selected as anchor points. Structure propagation module 108 specifies additional anchor points, sparsely sampled, from the three curves, as shown in FIG. 5, image (b). Directly applying dynamic programming on such a graph is, however, computationally expensive. For the general graph G={V,E} with K intersection nodes, the complexity of dynamic programming is $O(LN^{2+K})$ (State combinations at the intersecting nodes are enumerated). Instead, structure propagation module 108 utilizes an efficient belief propagation algorithm to minimize the energy $E(X)$ with complexity $O(2LN^2)$, as now described.

Exemplary Completion Using Belief Propagation (BP)

Belief propagation is a probability inference algorithm used in machine learning and computer vision. In this implementation, belief propagation is a local message passing algorithm used to minimize the Gibbs energy defined on a pairwise undirected graph, e.g., the energy $E(X)$. The basic mechanism of belief propagation is for each node in a graph to receive messages from its neighbors, then to send updated messages back to each of them. (Each node in the graph corresponds to a respective anchor point). We denote the message sent from node i to j as $M_{ij}$, which is a vector with N elements over all values of $x_j$. For purposes of exemplary illustration, such vectors are shown in FIG. 5, graphs (c) and (d), and also represented with respective portions of "other data" 124. A message $M_{ij}$ indicates how likely node i believes that node j has the corresponding label $x_j$. In this implementation, structure propagation module 108 implements an algorithm of belief propagation for image completion as shown below in Table 1.

TABLE 1

EXEMPLARY BELIEF PROPAGATION

1. Initialize all messages $M_{ij}^0 = 0$ between any two adjacent nodes i and j in Graph G.

2. Update all messages $M_{ij}^t$ iteratively from t = 1 to T:

$$M_{ij}^t = \min_{x_i}\left\{E_1(x_i) + E_2(x_i, x_j) + \sum_{k \neq j, k \in N(i)} M_{ki}^{t-1}\right\} \quad (5)$$

where N(i) are all adjacent nodes of i.

3. Compute optimal label $x_i^*$ for each node i:

$$x_i^* = \arg\min_{x_i}\left\{E_1(x_i) + \sum_{k \in N(i)} M_{ki}^T\right\} \quad (6)$$

Referring to Table 1, the core of belief propagation is its iterative message updating procedure (Equation (5)). Once the optimized labels $\{x_i^*\}_{i=1}^L$ are computed, structure propagation module 108 copies the sample $P(x_i^*)$ to each node i to complete structure propagation. Conventional belief propagation algorithms are defined in terms of probability distributions. There are two versions of belief propagation: sum-product and max-product. Sum-product computes the marginal posterior of each node, and max-product maximizes the posterior of each node. Structure propagation module 108 utilizes the max-product. Using negative log probabilities, Equation (5) turns max-product into min-sum.

For a graph without any loops (a single connected graph), belief propagation guarantees that structure propagation module 108 will find the optimal solution after, at most, T iterations, where T is the maximum distance between any two nodes in the graph. For example, T is 11 for the graph shown in FIG. 5, image (b).

Referring to FIG. 5, images (c) and (d), there are shown two basic types of intersecting structures: T-junctions and X-junctions. For example, image (b) shows an exemplary combination of a T-junction and an X-junction. To illustrate the belief propagation algorithm, the message updating procedure for the graph in image (c) is now described in reference to Table 2. Belief propagation computes the optimal solutions for all nodes simultaneously (the notation of iteration t is ignored in the rest of this section).

TABLE 2

EXEMPLARY BELIEF PROPAGATION MESSAGE UPDATING $$x_1^* = \arg\min_{x_1}\{E_1(x_1) + M_{21}\} \quad (7)$$

$$x_2^* = \arg\min_{x_2}\{E_1(x_2) + M_{12} + M_{32} + M_{42}\}$$

$$x_3^* = \arg\min_{x_3}\{E_1(x_3) + M_{23}\}$$

$$x_4^* = \arg\min_{x_4}\{E_1(x_4) + M_{24}\}$$

where each message is updated as follows:

$$M_{12} = \min_{x_1}\{E_1(x_1) + E_2(x_1, x_2)\} \quad (8)$$

$$M_{32} = \min_{x_3}\{E_1(x_3) + E_2(x_2, x_3)\}$$

-continued $$M_{42} = \min_{x_4}\{E_1(x_4) + E_2(x_2, x_4)\}$$

$$M_{21} = \min_{x_2}\{E_1(x_2) + E_2(x_1, x_2) + M_{32} + M_{42}\}$$

$$M_{23} = \min_{x_2}\{E_1(x_2) + E_2(x_2, x_3) + M_{12} + M_{42}\}$$

$$M_{24} = \min_{x_2}\{E_1(x_2) + E_2(x_2, x_4) + M_{12} + M_{32}\}.$$

Referring to Table 2, after the first iteration, structure propagation module 108 converges messages $M_{12}$, $M_{32}$ and $M_{42}$ such that the optimal solution of $x_2^*$ is obtained. After the second iteration, the optimal solution for all nodes is obtained.

Complexity of Belief Propagation

For a graph without any loops, the complexity of the standard belief propagation is $O(2TLN^2)$. This is because each message update uses $O(N^2)$ operations. However, each message is updated only when all necessary neighboring messages are converged. As an example, in FIG. 5, image (c), messages $M_{12}$, $M_{32}$ and $M_{42}$ will converge after the first iteration, and are not be updated again. Messages $M_{21}$, $M_{23}$ and $M_{24}$ converge at the second iteration, and it is not necessary to update them at the first iteration. In view of this, and in this implementation, structure propagation module 108 associates each message with a binary variable to avoid unnecessary updates. In this manner, the complexity of belief propagation for a graph without any loops is reduced to $O(2LN^2)$ and is independent of the number of intersection nodes. For a typical value of $N=10^3$, the running time of belief propagation is about a few seconds, while dynamic programming might take hours.

Dynamic Programming, Belief Propagation (BP), and Loopy BP

DP and BP: dynamic programming, alternatively, can be defined as follows. $M_{i-1,i}(x_i)$ represents the cumulative minimal cost from node 1 to node i (the cost $E_1(x_i)$ at node i is exclusive) for all possible $x_i$. We denote $\{M_{i-1,i}(x_i)\}_{x_i=1}^N$ as a vector $M_{i-1,i}$ with N elements. The update equation of the cumulative minimal cost $M_{i-1,i}$ is:

$$M_{i-1,i} = \min_{x_{i-1}}\{E_1(x_{i-1}) + E_2(x_{i-1}, x_i) + M_{i-2,i-1}\}, \quad (9)$$

wherein $M_{0,1}=0$. The converged optimal solution at node L is obtained by $x_L^* = \arg\min_{x_L}\{E_1(x_L)+M_{L-1,L}\}$. Equation (9) and the message update equation (5) in belief propagation are equivalent when the graph is a single chain. Therefore, in a single chain, the cumulative minimal cost is an alternative interpretation of the message in belief propagation. Belief propagation can be viewed as a "parallel" generalization of dynamic programming on a general graph.

Loopy BP: For a graph with loops, structure propagation module 108 can apply the belief propagation algorithm without modification, using loopy belief propagation. For a graph with a single loop, it has been shown that max-product belief propagation will yield the optimal solution if it converges. For a graph with multiple loops, loopy belief propagation usually gives a local minimum if it converges. Recent empirical results on several computer vision problems show that belief propagation is often a very good approximation even for graphs with thousands of loops.

Exemplary Texture Propagation

Figure 6:
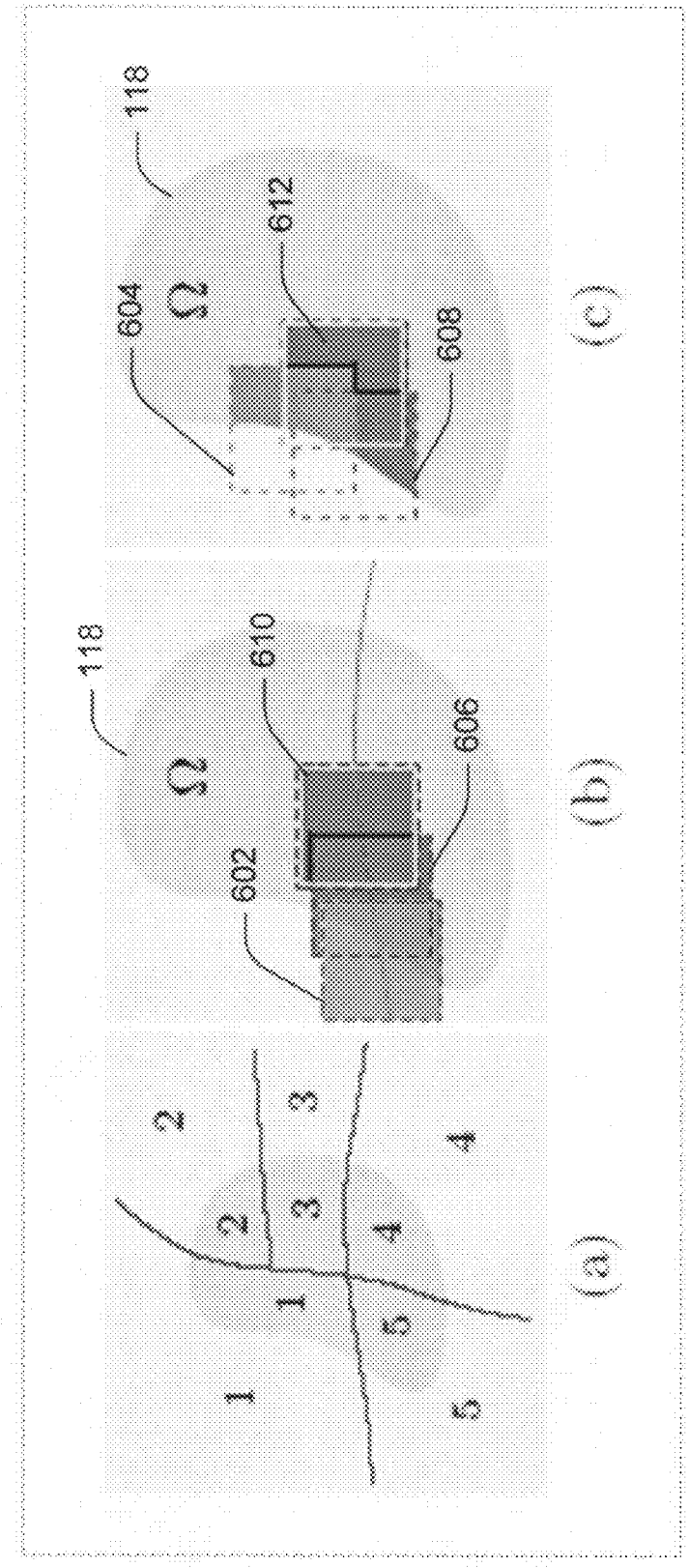
FIG. 6 illustrates exemplary texture propagation for unknown sub-regions.

FIG. 6 illustrates exemplary texture propagation for unknown sub-regions. For purposes of exemplary illustration, the operations of the procedure are described in reference to the components of FIG. 1. In the figures, the left-most digit of a component reference number identifies the particular figure in which the component first appears. More particularly, image (a) of FIG. 6 illustrates texture propagation, wherein labels of unknown and known sub-regions are determined by user-specified curves 114. Each unknown sub-region is completed using only the samples in its corresponding known sub-region. Images (b) and (c) of FIG. 6 illustrate exemplary photometric correction. Rectangles or regions 602 through 612 represent the first three synthesized patches 122 copied into the unknown region 118. Utilizing photometric correction, structure propagation module 108 removes the seam between overlapping patches from structure propagation (image (b)) and from texture propagation (image (c)).

After structure propagation, there may still exist unknown regions 118 that need to be filled in with texture, color, etc. However, applying texture synthesis directly to such areas may produce poor results, as the synthesis process may sample irrelevant texture information from the entire known region. The unknown/known regions have been partitioned into several disjoint sub-regions by user-specified curves 114. Each unknown sub-region (unknown region 118) is usually adjacent to one known sub-region (known region 116). We can label each corresponding pair of known/unknown sub-regions by the same number, as shown in FIG. 6, image (a). Afterwards, structure propagation module 108 propagates texture information from corresponding sub-regions using texture-by-numbers techniques. The synthesized patch propagation order (patch priority) and propagation of linear structures is accomplished by generating a confidence map and using image edges using known techniques. Such a confidence map is represented with a respective portion of "other data" 120. In one implementation, when a sub-region does not have a sufficient number of samples, a user interactively assigns labels to respective ones of the sub-regions.

Exemplary Photometric Correction

For an image 112 with significant spatial variations in intensity or color, the seams between overlapping synthesized patches 122 may be visible, especially when the patch size is large. Such seams typically cannot be easily removed by conventional simple blending or graph-cut operations. To address this problem, structure propagation module 108 implements photometric correction operations to reduce the photometric seams in the gradient domain.

FIG. 6, image (b) illustrates photometric correction in structure propagation. Suppose that the rectangles 602 and 606 are two patches that have already been synthesized, and the rectangle 610 represents the place for the third patch. First, structure propagation module 108 copies pixels to the portion of block 610 delineated by the darker shading (i.e., the 6-sided dark shaded portion bounded by associated hatch lines and darker solid interior lines) from corresponding pixels in the sample patch (e.g., a patch 602 and/or 606) to get a new synthesized patch J (e.g., a patch 610). Then structure propagation module 108 constructs a binary mask patch $B_M$ whose value is 0 in region 606 and 1 in region 610. Finally, structure propagation module 108 reconstructs a new J* from its corrected gradient $\nabla J^*$ by solving Poisson equations. To remove the photometric seam (thicker black line in FIG. 6, image (b)) between overlapping regions, structure propagation module 108 corrects gradient $\nabla J$ to obtain $\nabla J^*$ as follows:

$$\nabla J_x(x, y)^* = \begin{cases} \nabla J_x(x, y) & B_M(x, y) = B_M(x+1, y) \\ 0 & B_M(x, y) \neq B_M(x+1, y) \end{cases}$$

Structure propagation module 108 computes $\nabla J_y(x,y)^*$ in a similar way. The Dirichlet boundary condition is the interior boundary, which in this example, is located interior to the hatched area of block 610 of FIG. 6, image(b)) of patch J. The red, green, and blue channels are corrected independently. Photometric correction in texture propagation performs in a similar way as shown in FIG. 6, image (c).

Figure 7:
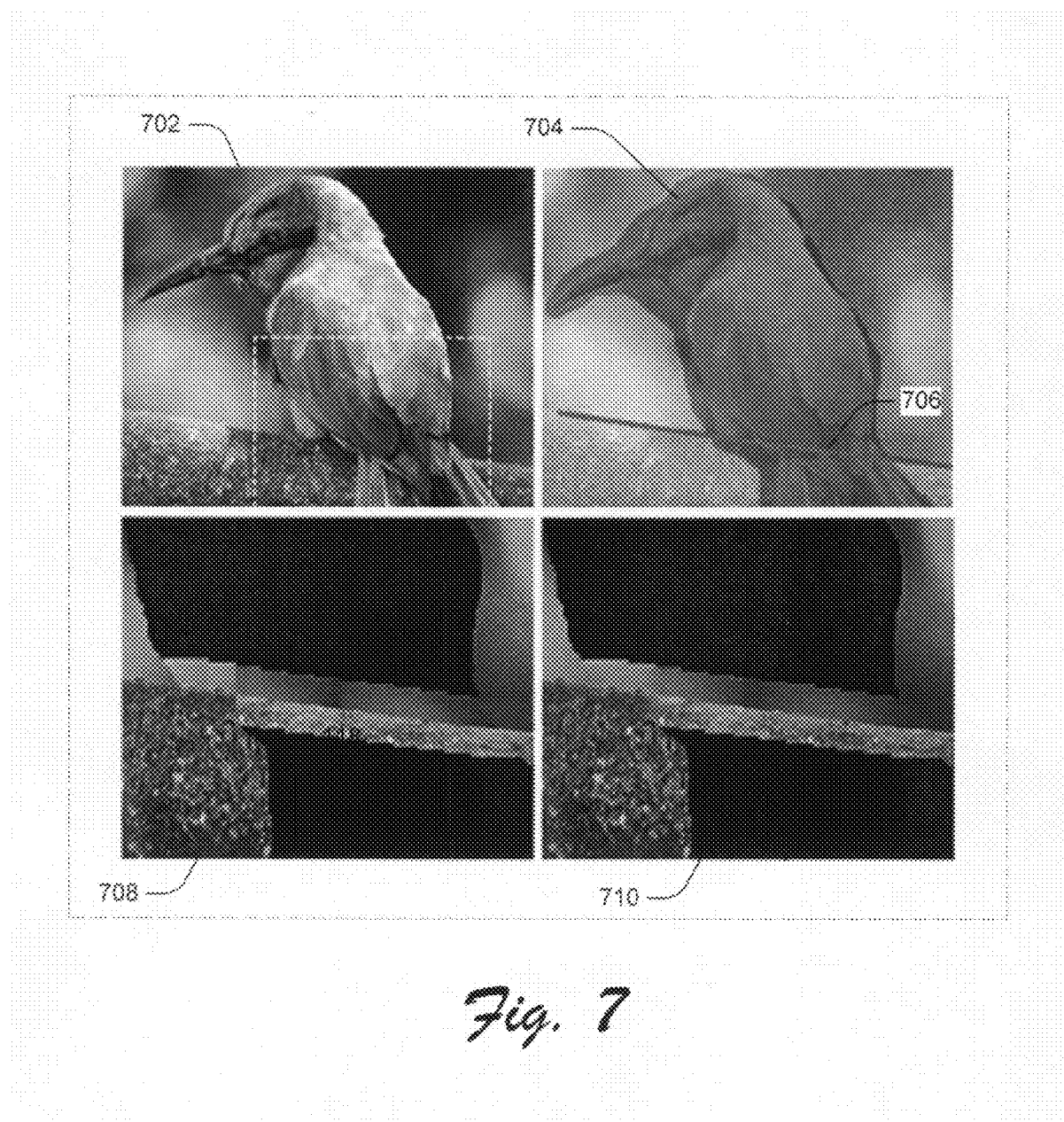
FIG. 7 shows and exemplary comparison before and after photometric correction in structure propagation.

FIG. 7 shows and exemplary comparison before and after photometric correction in structure propagation. More particularly, image 702 represents an input image 112. Reference number 704 points to an unknown region 118 the shaded area surrounding the bird). Image 708 represents an exemplary zoomed in view of structure propagation results before photometric correction. Image 710 represents an exemplary zoomed in view of structure propagation results after photometric correction.

Exemplary Sample Transformation

Sometimes sample patches (e.g., patches 602 and 606 of FIG. 6, image (b)) may not have sufficient structure for the purpose of structure propagation. To address this, structure propagation module 108 provides one or more solutions to enrich the sample set by transforming existing sample patches. For example, in one implementation, structure propagation module 108 allows a user to rotate, by a fixed angle (e.g. 90°) or flip (horizontally or vertically), each source patch. In another implementation, for example, structure propagation module 108 allows the user to rotate each source patch $P(x_i)$ by an arbitrary rotation angle θ for each node i. A patch, for example, could be rotated to best align the curve segment $c_{x_i}$ (user-specified curve 114) in the source patch to the curve segment $c_i$ in the target rectangle (e.g., patch 610 of FIG. 6) by a rotation transformation $R(c_{x_i}; \theta)$, such that:

$$\theta^* = \arg \min_\theta \{d(R(c_{x_i}; \theta), c_i) + d(c_i, R(c_{x_i}; \theta))\},$$

wherein d(•,•) has the same definition as in Equation (3).

EXAMPLES OF IMAGE COMPLETION WITH STRUCTURE PROPAGATION

Figure 8:
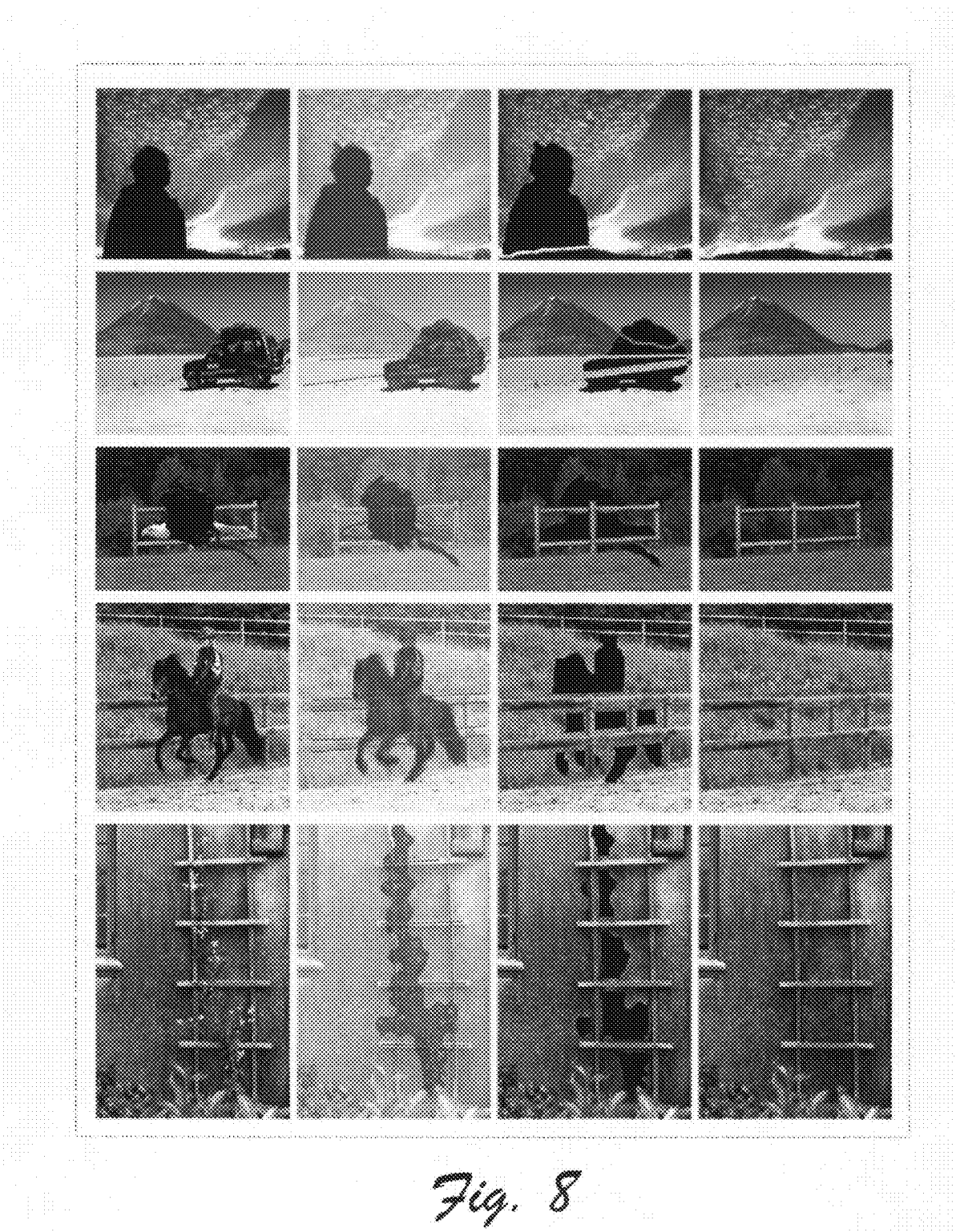
FIG. 8 shows multiple images arranged in rows and columns to show exemplary results of image completion with structure propagation.

FIG. 8 shows several examples of image completion with structure propagation. FIG. 8 shows multiple images arranged in rows and columns to show exemplary results of image completion with structure propagation. The first image in each row in the first column is an original input image 112. Subsequent images in the same row as an original input image 112 represent sequential operations, which implement image completion with structure propagation. For example, images in column 2 show exemplary unknown regions 118 (shaded areas); images in column 2 show exemplary user-specified curves 114 (line segments); images in column 3 represent exemplary results of structure propagation; and images in column 4 represent exemplary results of texture propagation.

Alternate Implementations

Figure 9:
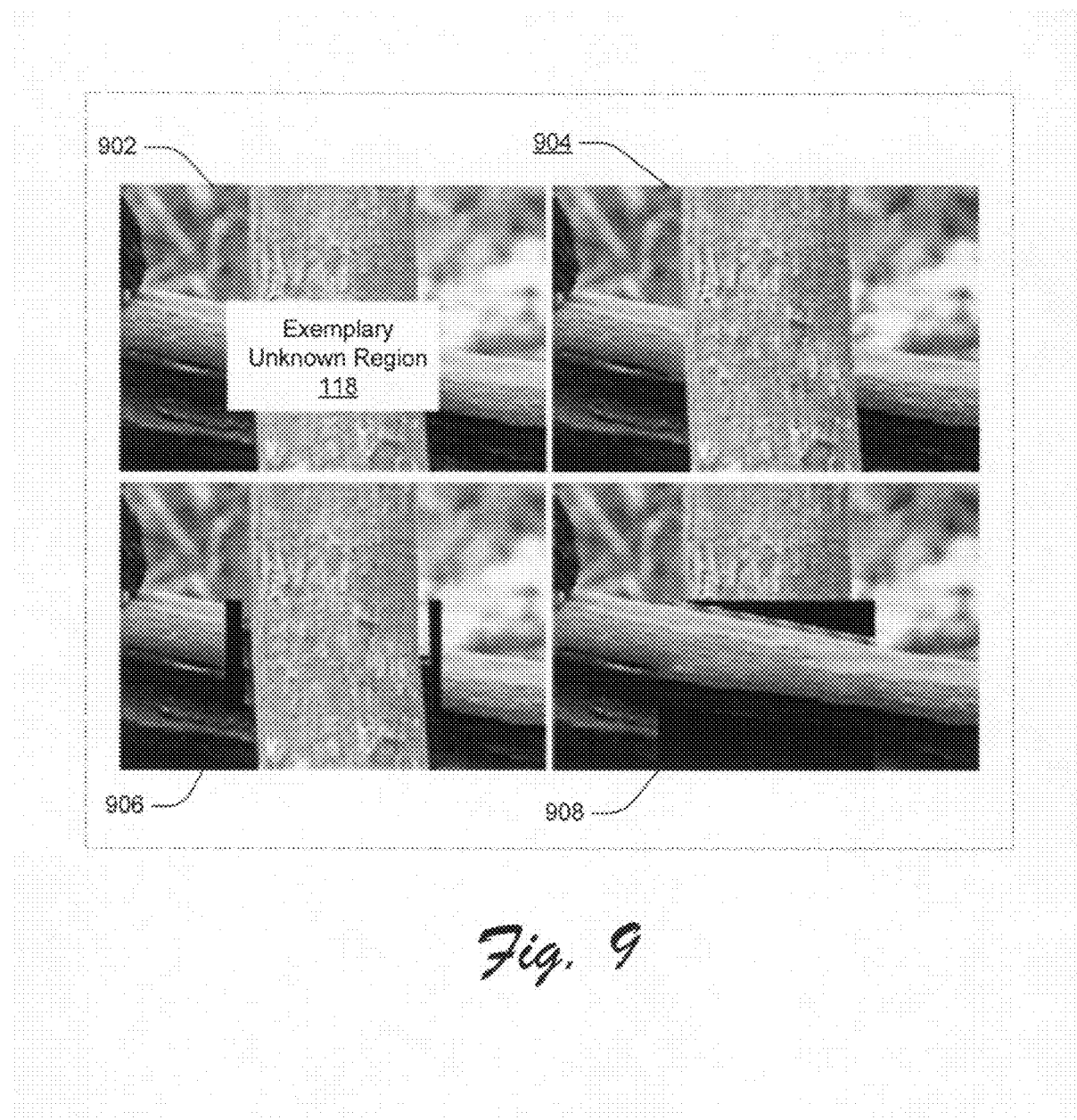
FIG. 9 shows exemplary layer-based image completion with structure propagation, wherein the input image is comprised of multiple image layers.

FIG. 9 shows exemplary layer-based image completion with structure propagation, wherein the input image is comprised of multiple image layers. More particularly, image 902 represents the input image 112. Image 904 represents the result of layer-based image completion with structure propagation. Image 906 represents a completed vertical trunk layer. Image 908 represents a completed horizontal trunk layer.

In one implementation, structure propagation module 108 implements layers to handle depth ambiguity, as shown in FIG. 9. More particularly, structure propagation module 108 completes the missing region 118 in multiple separate layers. In this example, there is a vertical trunk, horizontal trunk, and background layer (not shown). In the first two layers, the trunks are completed by specifying two curves 114 along the trunk boundaries and automatically extracted by the Bayesian matting technique. The background layer is completed by texture propagation. The final image completion with structure propagation results, in this example, are the composition of the three layers from back to front.

Exemplary Procedure

Figure 10:
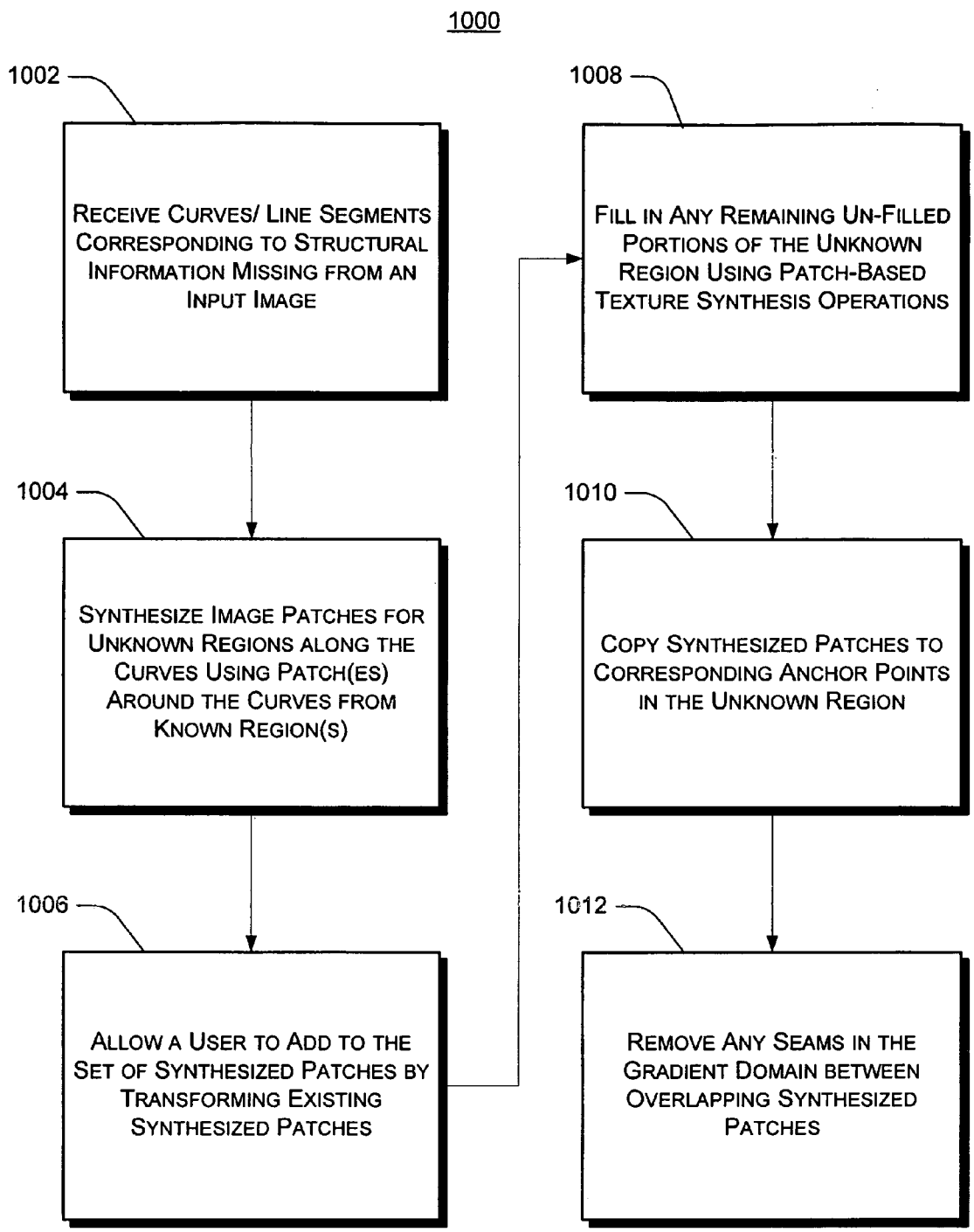
FIG. 10 shows an exemplary procedure for image completion with structure propagation.

FIG. 10 shows an exemplary procedure for image completion with structure propagation. For purposes of discussion and exemplary illustration, operations of this procedure are described with respect to components of FIG. 1. The left-most digit of a component reference number identifies the particular figure in which the component first appears. At block 1002, structure propagation module 108 receives curves/line segments 114. The curves/line segments 114 correspond to structural information in an unknown region 118 in an input image 112. The structural information is missing from the unknown region 118 portion of the input image 112. In one implementation, curves/line segments 114 are specified by a user, for example, with a pointing device such as a mouse or a graphics pen, and/or the like.

At block 1004, structure propagation module 108 synthesizes image patches 122 for unknown regions 118 along the generated curves/line segments 114. The synthesized image patches 122 are generated using structure and texture information from patches of known regions 116. Known regions 116 are proximately located to the terminal portions of curves/line segments 114. More particularly, structure propagation module 108 sparsely samples each curve/line segment 114 in the unknown region 118 to generate a set of anchor points. Centers of synthesized patches 122 are located at respective ones of these anchor points, forming a single chain, or a one dimensional graph. The patches from known regions 116 used to generate synthesized patches 122 are selected based on one or more of structural similarity, a boundary completion constraint, and an adjacent synthesized patch coherence constraint.

If curve/line segment 114 includes only a single curve/line segment, the operations of block 1004 generate synthesized patches 122 to propagate structure to the unknown region 118 using dynamic programming operations. These dynamic programming operations connect synthesized patches 122 as a chain and substantially minimize energy E(X) (i.e., search for a minimal cost path) for structure propagation. Such dynamic programming operations globally-minimize any color difference in overlapping areas between neighboring patches 122.

If curves/line segments 114 include multiple intersecting curves/line segments (a 2-D graph), the operations of block 1000 for generate synthesized patches 122 to propagate structure to the unknown region 118 using a belief propagation algorithm to locate substantially optimal patches for filling the unknown region 118. The belief propagation algorithm connects respective ones of synthesized patches 122 as a graph to globally-minimize any color difference in overlapping areas between neighboring synthesized patches 122. More particularly, structure propagation module 108 selects curve/line segment intersections as anchor points. Structure propagation module 108 sparsely samples the curves/line segments to specify additional anchor points. For each anchor point, structure propagation module 108 computes messages between respective anchor points to indicate how likely a particular anchor point (node) believes that an adjacent node has a label to a corresponding synthesized patch 122. Each message minimizes energy that is a function of completion $(E_1(x_i))$ and coherence $(E_2(x_i,x_j))$ constraints. As a function of these messages, structure propagation module 108 computes the optimal label (corresponding to a respective synthesized patch 122) for each node (anchor point).

In one implementation, the operations of block 1008 are layer-based to allow image completion with structure propagation in a manner that handles depth ambiguity. This is accomplished, for example, with a Bayesian matting technique.

At block 1006, structure propagation module 108 allows a user to enrich the set of synthesized patches 122, for example, by transforming existing synthesized patches 122. In one implementation, this is accomplished by allowing the user to rotate one or more synthesized patches 122 by an arbitrary rotation angle for one or more anchor points.

At block 1008, structure propagation module 108 fills in any remaining un-filled portions of the unknown region 118 using patch-based texture synthesis operations. In one implementation, this is accomplished by copying, for each un-filled portion, relevant texture information from a specific sub-region of the known region 116 that corresponds to the un-filled portion. The specific sub-region, for example, may be a region of the known region 116 that is adjacent to the un-filled portion. In this manner, the synthesis process does not sample irrelevant texture information from the entire known region 116, but rather synthesizes information only from the associated specific sub-region of the known region 116.

At block 1010, structure propagation module 108 copies synthesized patches 122 that have been assigned based on one or more operations of blocks 1004 through 1008, to corresponding anchor points in the unknown region 118. (Anchor points are shown as a respective portion of "other data" 124 of FIG. 1).

At block 1012, structure propagation module 108 removes any seams in the gradient domain between overlapping synthesized patches 122 that have been copied to the unknown region 118 using photometric correction operations.

An Exemplary Operating Environment

Figure 11:
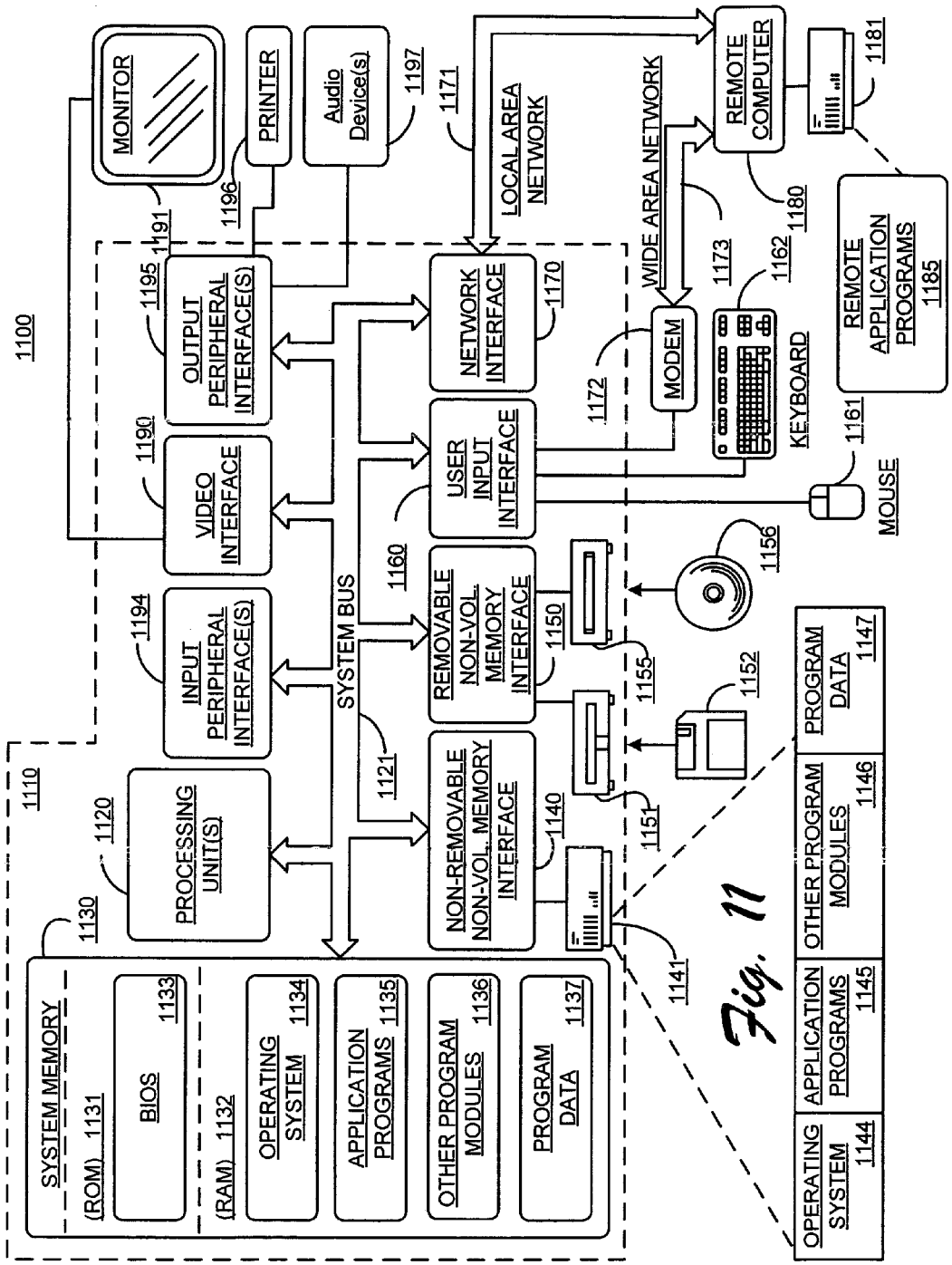
FIG. 11 illustrates an example of a suitable computing environment in which image completion with structure propagation may be fully or partially implemented.

FIG. 11 illustrates an example of a suitable computing environment in which image completion with structure propagation may be fully or partially implemented. Exemplary computing environment 1000 is only one example of a suitable computing environment for the exemplary system 100 of FIG. 1 and exemplary operations of FIG. 10, and is not intended to suggest any limitation as to the scope of use or functionality of systems and methods the described herein. Neither should computing environment 1100 be interpreted as having any dependency or requirement relating to any one or combination of components illustrated in computing environment 1100.

The methods and systems described herein are operational with numerous other general purpose or special purpose computing system, environments or configurations. Examples of well-known computing systems, environments, and/or configurations that may be suitable for use include, but are not limited to personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention, although not required, may be practiced in a distributed computing environment where tasks are performed by remote processing devices that are linked through a communications network. In a distributed computing environment, program modules may be located in both local and remote memory storage devices.

With reference to FIG. 11, an exemplary system providing image completion with structure propagation includes a general-purpose computing device in the form of a computer 1110 implementing, for example, system 100 of FIG. 1. Components of computer 1110 may include, but are not limited to, processing unit(s) 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 1110 typically includes a variety of computer-readable media. Computer-readable media can be any available media that can be accessed by computer 1110, including both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer-readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that they are at least different copies.

A user may enter commands and information into the computer 1110 through input devices such as a keyboard 1162 and pointing device 1161, commonly referred to as a mouse, trackball or touch pad. Other input devices (not shown) may include a microphone, joystick, graphics pen and pad, satellite dish, scanner, or the like. These and other input devices are often connected to the processing unit 1120 through a user input interface 1160 that is coupled to the system bus 1121, but may be connected by other interface and bus structures, such as a parallel port, game port or a universal serial bus (USB).

A monitor 1191 or other type of display device is also connected to the system bus 1121 via an interface, such as a video interface 1190. In addition to the monitor, computers may also include other peripheral output devices such as printer 1196 and audio device(s) 1197, which may be connected through an output peripheral interface 1195.

The computer 1110 operates in a networked environment using logical connections to one or more remote computers, such as a remote computer 1180. In one implementation, remote computer 1180 represents computing device 102 of FIG. 1. The remote computer 1180 may be a personal computer, a server, a router, a network PC, a peer device or other common network node, and as a function of its particular implementation, may include many or all of the elements described above relative to the computer 1110, although only a memory storage device 1181 has been illustrated in FIG. 11. The logical connections depicted in FIG. 11 include a local area network (LAN) 1181 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example and not limitation, FIG. 11 illustrates remote application programs 1185 as residing on memory device 1181. The network connections shown are exemplary and other means of establishing a communications link between the computers may be used.

CONCLUSION

Although the systems and methods for image completion with structure propagation have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A computer-implemented method comprising:
   generating synthesized patches for an unknown region in an input image, the synthesized patches being automatically generated from a known region in the input image based on information from one or more curves manually drawn on the input image with a computer input pointing device, the one or more curves drawn with respect to the unknown region, the one or more curves specifying missing structure in the unknown region;
   propagating structure to the unknown region with the synthesized patches, the propagating including completing images where X-junctions exist in the unknown region by specifying structure to be propagated based on the one or more curves drawn with respect to the unknown region; and
   propagating texture to the unknown region subsequent to propagating structure to the unknown region and separate from propagating structure to the unknown region.

2. A method of claim 1, wherein the one or more curves are user-specified curves.

3. A method of claim 1, wherein generating further comprises determining the synthesized patches using structure and texture information from patches of the known region.

4. A method of claim 1, wherein generating further comprises determining the synthesized patches based on one or more of structural similarity, a boundary completion constraint, and an adjacent synthesized patch coherence constraint.

5. A method of claim 1, wherein generating further comprises handling depth ambiguity by generating the synthesized patches based on multiple image layers.

6. A method of claim 1, wherein generating further comprises creating the synthesized patches using one or more of dynamic programming and a belief propagation algorithm.

7. A method of claim 1, wherein generating further comprises adding transformed patches to the synthesized patches by rotating one or more of the synthesized patches by an arbitrary rotation angle.

8. A method of claim 1, wherein generating further comprises:
   determining that there are one or more sub-regions of the unknown region for which there is no corresponding patch of the synthesized patches;
   responsive to the determining, identifying relevant texture information from one or more specific sub-regions of the known region, each of the one or more specific sub-regions corresponding to a respective one of the one or more sub-regions of the unknown region;
   creating one or more additional synthesized patches from the one or more specific sub-regions of the known region; and
   adding the one or more additional synthesized patches to the synthesized patches.

9. A method of claim 8, wherein each sub-region of the specific sub-regions of the known region is adjacent to a respective one of the one are more sub-regions of the unknown region.

10. A method of claim 1, further comprising copying the synthesized patches to corresponding areas of the unknown region to complete the input image via structure propagation.

11. A method of claim 1, further comprising:
    copying the synthesized patches to corresponding areas of the unknown region; and
    removing any seam in the gradient domain between any overlapping ones of the synthesized patches.

12. A computer-implemented method comprising:
    receiving one or more user-specified and manually drawn curves using a computer input pointing device, the curves providing missing structural information in an unknown region of an input image;
    propagating structure along the one or more user-specified and manually drawn curves with one or more synthesized patches, each synthesized patch being automatically generated from a known region of the input image.

13. A method of claim 12, wherein propagating structure further comprises:
    determining that there is only a single curve of the one or more user-specified curves;
    responsive to the determining, selecting respective ones of the one or more synthesized patches to substantially minimize energy between adjacent ones of the one or more synthesized patches; and
    propagating the respective ones as a chain along the single curve.

14. A method of claim 12, wherein propagating further comprises adding transformed patches to the synthesized patches by rotating one or more of the synthesized patches by an arbitrary rotation angle.

15. A method of claim 12, wherein propagating further comprises creating additional patches to add to the synthesized patches, the additional patches for propagating structure to one or more un-filled sub-regions of the unknown region, each patch of the additional patches being generated from an area of the known region adjacent to a corresponding sub-region of the one or more un-field sub-regions, the area corresponding to less than the entire known region.

16. A method of claim 12, wherein the method further comprises:
    sparsely sampling the one or more user-specified curves to specify a set of anchor points;

generating the one or more synthesized patches using texture information from one or more areas of the known region, each patch of the synthesized patch having a center located at a respective one anchor point of anchor points; and wherein generating further comprises selecting each patch of the synthesized patches based on one or more of the following criteria: structural similarity, a boundary completion constraint, and an adjacent synthesized patch coherence constraint.

17. A method of claim 12, further comprising removing any seam in the gradient domain between any overlapping ones of the synthesized patches with photometric correction.

18. A method of claim 12, wherein propagating structure further comprises:
   determining that the one or more user-specified curves comprise multiple intersecting curves;
   responsive to the determining, connecting certain ones of the one or more synthesized patches as a graph to globally-minimize any color difference and overlapping areas between neighboring synthesized patches.

19. A method of claim 18, wherein connecting further comprises implementing a belief propagation algorithm to identify each of the certain ones of the one or more synthesized patches.

20. A method of claim 18, wherein connecting further comprises:
   identifying an intersection of at least two of the multiple intersecting curves as an anchor point;
   sparsely sampling each of the multiple intersecting curves to specify additional anchor points;
   for each anchor point of the anchor points, computing a message between one or more of adjacent anchor points of the anchor points, the message indicating how likely the anchor point believes that an adjacent anchor point is a corresponding synthesized patch of the one or more synthesized patches, the message minimizes energy between the one or more adjacent anchor points as a function of completion and coherence constraints; and
   selecting each patch of the certain ones of the one or more synthesized patches such that the patch has minimized energy with respect to any adjacent patch.

* * * * *